US012725361B2

(12) United States Patent
Guo et al.

(10) Patent No.: US 12,725,361 B2
(45) Date of Patent: Sep. 1, 2026

(54) MESH MODEL TRANSFORMATION

(71) Applicant: Tencent Technology (Shenzhen) Company Limited, Shenzhen (CN)

(72) Inventors: Zhengyang Guo, Shenzhen (CN); Yin Li, Shenzhen (CN); Hongyu Hou, Shenzhen (CN); Wujun Yi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 162 days.

(21) Appl. No.: 18/383,250

(22) Filed: Oct. 24, 2023

(65) Prior Publication Data

US 2024/0054728 A1 Feb. 15, 2024

Related U.S. Application Data

(63) Continuation of application No. PCT/CN2023/073411, filed on Jan. 20, 2023.

(30) Foreign Application Priority Data

Mar. 28, 2022 (CN) ........................ 202210316824.4

(51) Int. Cl.

*G06T 17/20* (2006.01)
*G06T 7/10* (2017.01)
*G06T 7/73* (2017.01)

(52) U.S. Cl.

CPC .............. *G06T 17/205* (2013.01); *G06T 7/10* (2017.01); *G06T 7/75* (2017.01); *G06T 2207/20161* (2013.01)

(58) Field of Classification Search

CPC ........... G06T 17/205; G06T 7/10; G06T 7/75; G06T 2207/20161

See application file for complete search history.

(56) References Cited

U.S. PATENT DOCUMENTS 10,878,610 B1 12/2020 Wallis
2013/0215115 A1 8/2013 Jenkins (Continued)

FOREIGN PATENT DOCUMENTS

CN 110738723 * 1/2020 ............. G06T 17/20
CN 115409951 * 11/2022 ............. G06T 17/00
WO 2021238188 A1 12/2021

OTHER PUBLICATIONS

Lin et al., Interactive Image Segmentation with First Click Attention, CVPR 2020 (Year: 2020).*

(Continued)

*Primary Examiner* — Phuc N Doan
(74) *Attorney, Agent, or Firm* — Banner & Witcoff, Ltd.

(57) ABSTRACT

Mesh model processing techniques and innovations are described herein. A mesh processing method may include determining, on the basis of a positional relationship between a first vector on a first mesh model and at least one first spline, at least one target value corresponding to the first corner; determining the at least one target value corresponding to the first corner to be at least one respective target value corresponding to the second corner; determining a vertex coordinate of a second vertex on the basis of the at least one target value corresponding to the second corner; and determining a second mesh model at the second corner on the basis of the vertex coordinate of the second vertex. The method can ensure that a connection surface between the second corner and an adjacent wall is still perpendicular to the wall, a thickness of the wall on the second mesh model is the same as a thickness of a wall on a first mesh model, and cracks or interpenetrating may not occur between the second corner and the adjacent wall.

20 Claims, 7 Drawing Sheets

(56) References Cited

U.S. PATENT DOCUMENTS

| | | | |
|---|---|---|---|
| 2016/0005222 A1 | 1/2016 | Tomaru et al. | |
| 2016/0275207 A1* | 9/2016 | Qian | G06T 17/205 |
| 2019/0318548 A1* | 10/2019 | Kim | G06T 17/20 |
| 2021/0357622 A1* | 11/2021 | Keinert | G06T 7/50 |

OTHER PUBLICATIONS

Sederberg, T. W., & Parry, S. R., "Free-form deformation of solid geometric models," In Proceedings of the 13th annual conference on Computer Graphics and Interactive Techniques, Aug. 18-22, 1986, (pp. 151-160).

Patterson, T., Mitchell, N., & Sifakis, E. (2012)"Simulation of complex nonlinear elastic bodies using lattice deformers," ACM Transactions on Graphics (TOG), 31(6), Nov. 2012, pp. 1-10.

* cited by examiner

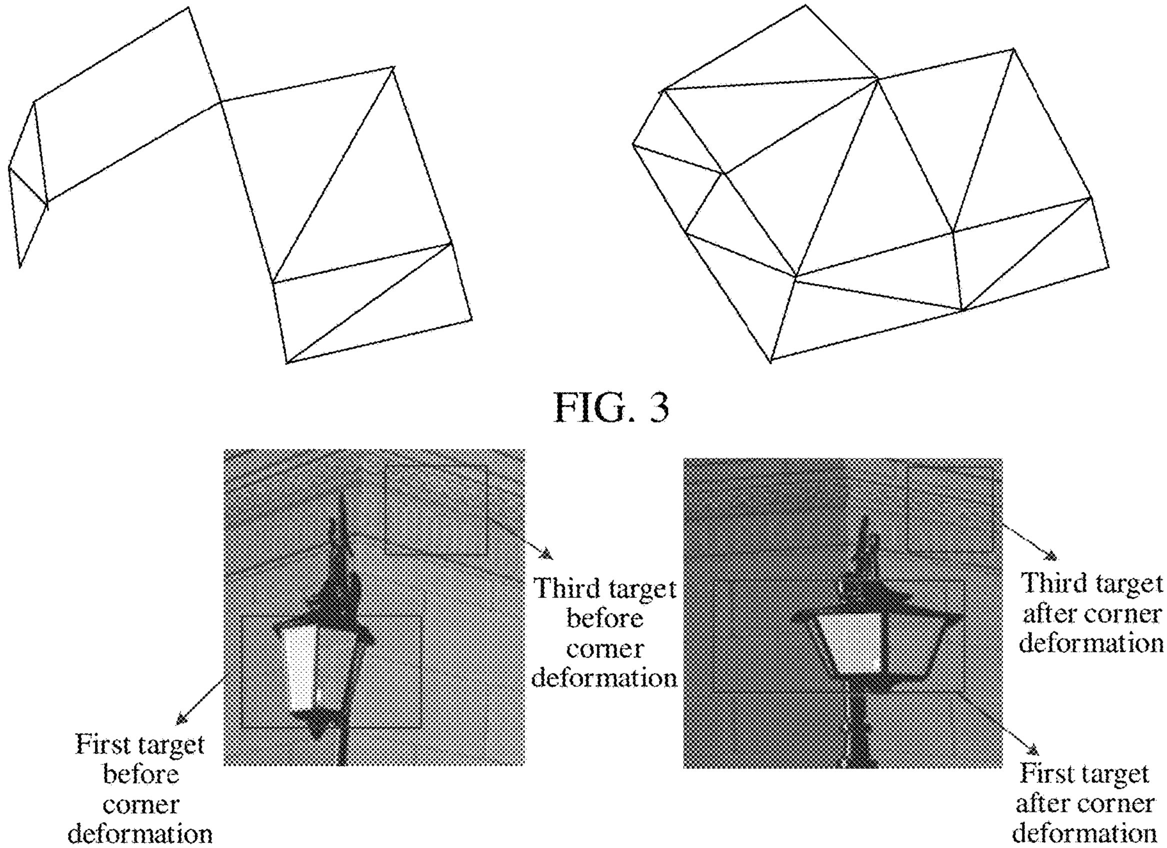
FIG. 3
FIG. 4
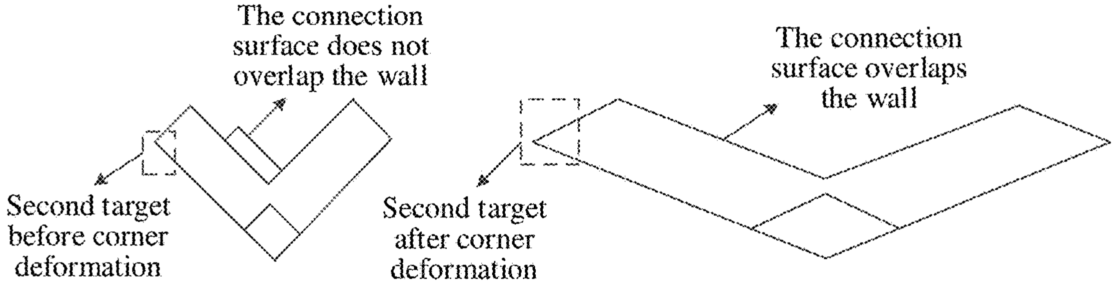
FIG. 5

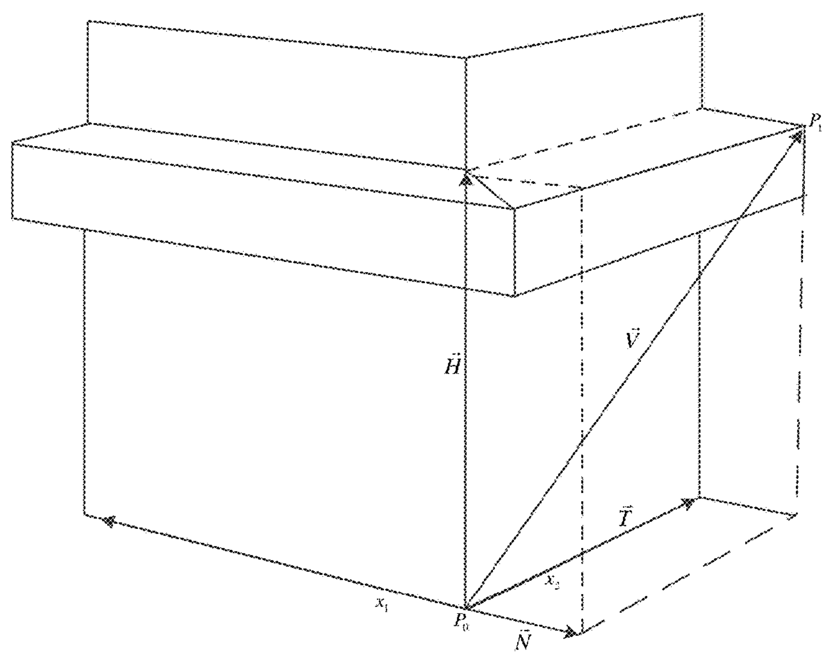
FIG. 8
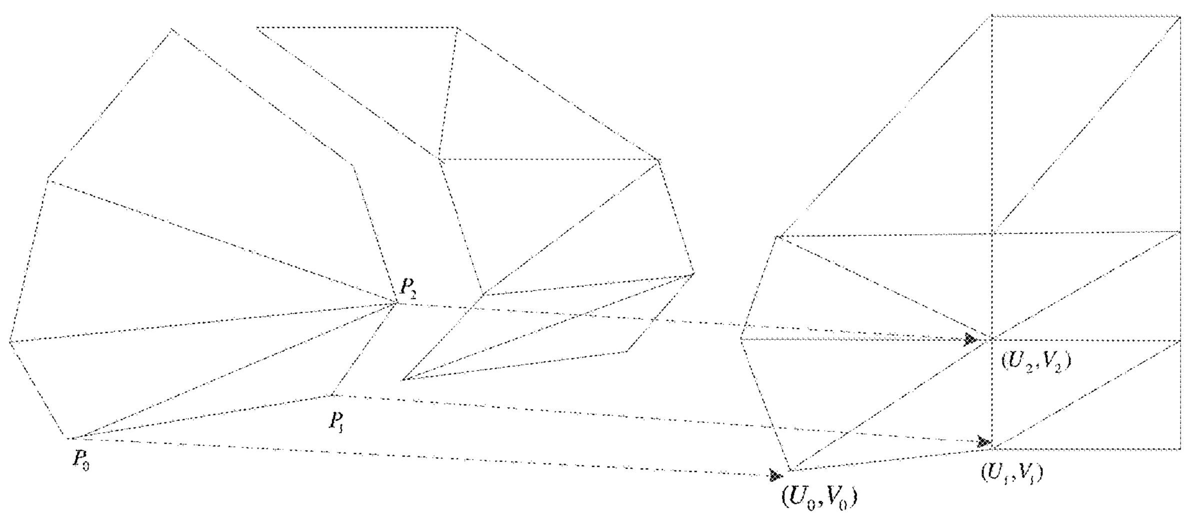
FIG. 9
There is a crack in the map of the wall
FIG. 10

MESH MODEL TRANSFORMATION

CROSS REFERENCE TO RELATED APPLICATIONS

This application claims priority to PCT Application PCT/CN2023/073411, filed Jan. 20, 2023, and Chinese Patent Application No. 202210316824.4, filed Mar. 28, 2022, each entitled "MESH MODEL PROCESSING METHOD AND APPARATUS, DEVICE, STORAGE MEDIUM", and each incorporated by reference in its entirety.

TECHNICAL FIELD

Embodiments of this application relate to the field of computer graphics of artificial intelligence, and more particularly, to a mesh model processing method and apparatus, a device, and a storage medium.

BACKGROUND ART

At present, there are usually two methods for angle deformation: free-form deformation (FFD) and lattice deformer. The FFD method is a commonly used deformation method, which generally includes: uniformly selecting m*n*k dot matrixes, including m layers, n rows, and k columns, as control points from a bounding box of a given static mesh; and when positions of the control points change, recalculating positions of respective vertexes on the static mesh usually according to Bernstein polynomial interpolation. The lattice deformer method is usually used for handling elastic deformation. Its operation is the same as that of the FFD method, including: uniformly selecting dot matrixes as control points from a bounding box; and when positions of the control points change, recalculating positions of respective vertexes on the mesh are recalculated. Moreover, in the lattice deformer, the change of each vertex on a mesh body is affected by its material, and a volume of the mesh body remains basically unchanged in the deformation process.

However, the above two deformation methods are not applicable to an architectural scene because the corner deformation may cause a connection surface between a corner and a wall to no longer be perpendicular to the wall, cause cracks in the connection surface, or cause the connection surface between the corner and the wall to overlap the wall.

SUMMARY

Aspects described herein provide a mesh model processing method and apparatus, a device, and a storage medium. After a first corner is deformed into a second corner, a positional relationship between a first vector at the first corner and at least one first spline is the same as a positional relationship between a second vertex at the second corner and a spline that passes through a control point used for controlling the second corner. Further, it is conductive to achieving that a connection surface between the second corner on a second mesh model and a wall on the second mesh model is still perpendicular to the wall, a thickness of the wall on the second mesh model is the same as a thickness of a wall on a first mesh model, and cracks or interpenetrating may not occur between the second corner on the second mesh model and the wall on the second mesh model.

According to a first aspect, a mesh model processing method may include: obtaining a first mesh model, the first mesh model including a first corner and a first vertex; obtaining a second corner in response to an operation, on a display interface, performed by a user on a first control point used for controlling the first corner; determining, on the basis of a positional relationship between a first vector and at least one first spline, at least one target value corresponding to the first corner, the first vector being a vector from the first control point to the first vertex, and the at least one first spline being a line passing through the first control point and used for representing a contour of the first mesh model; determining the at least one target value corresponding to the first corner to be at least one target value corresponding to the second corner, respectively; determining a vertex coordinate of a second vertex on the basis of the at least one target value corresponding to the second corner; and the second vertex being a vertex corresponding to the first vertex after the first corner is deformed into the second corner; and determining a second mesh model at the second corner on the basis of the vertex coordinate of the second vertex.

According to a second aspect, a mesh model processing apparatus may include: an obtaining unit, configured to obtain a first mesh model, the first mesh model including a first corner and a first vertex; a first determining unit, configured to obtain a second corner in response to an operation, on a display interface, performed by a user on a first control point used for controlling the first corner; a second determining unit, configured to determine, on the basis of a positional relationship between a first vector and at least one first spline, at least one target value corresponding to the first corner, the first vector being a vector from the first control point to the first vertex, and the at least one first spline being a line passing through the first control point and used for representing a contour of the first mesh model; a third determining unit, configured to determine the at least one target value corresponding to the first corner to be at least one target value corresponding to the second corner, respectively; a fourth determining unit, configured to determine a vertex coordinate of a second vertex on the basis of the at least one target value corresponding to the second corner, the second vertex being a vertex corresponding to the first vertex after the first corner is deformed into the second corner; and a fifth determining unit, configured to determine a second mesh model at the second corner on the basis of the vertex coordinate of the second vertex.

According to a third aspect an electronic device may include: a processor, configured to execute a computer program; and a computer-readable storage medium, the computer-readable storage medium storing a computer program, and the computer program being loaded and executed by a processor to perform any method as described herein.

According to a fourth aspect, a computer-readable storage medium stores computer instructions, and the computer instructions are read and executed by a processor of a computer device to cause the computer device to perform any method described herein.

In one illustrative aspect, the at least one target value corresponding to the first corner is determined to be the at least one target value corresponding to the second corner, respectively, and the vertex coordinate of the second vertex is determined on the basis of the at least one target value corresponding to the second corner. After the first corner is deformed into the second corner, the positional relationship between the first vector at the first corner and the at least one first spline is the same as the positional relationship between the second vertex at the second corner and the spline that passes through the control point used for controlling the second corner. Further, it is conductive to achieving that a connection surface between the second corner on a second mesh model and a wall on the second mesh model is still perpendicular to the wall, a thickness of the wall on the second mesh model is the same as a thickness of a wall on a first mesh model, and cracks or interpenetrating may not occur between the second corner on the second mesh model and the wall on the second mesh model.

In addition, compared to the FFD method and the lattice deformer method, the schemes described herein can generate the second mesh model at the second corner only if a user performs the operation, on the display interface, on the first control point used for controlling the first corner, so that there are few operation steps of the user, and use is simple and convenient. Furthermore, in the schemes of this application, a corner of the first mesh model can be deformed in any angle between 0° and 180° to obtain a mesh model with any corner, which increases the reuse rate of a model, saves art costs, and improves art production efficiency.

BRIEF DESCRIPTION OF THE DRAWINGS

To describe the technical solutions more clearly, the following briefly describes the accompanying drawings. The accompanying drawings in the following description show merely illustrative aspects and embodiments, and a person of ordinary skill in the art may still derive other drawings, aspects and embodiments from these accompanying drawings.

FIG. 3 depicts illustrative meshes for connecting thick walls using a corner, according to one or more illustrative aspects described herein.

FIG. 4 depicts a comparison of mesh models before and after corner deformation using a related technique.

FIG. 5 depicts relationships between a corner before and after corner deformation and a wall using a prior art technique.

FIG. 8 is an example of at least one target value corresponding to a first corner on a mesh model, according to one or more illustrative aspects described herein.

FIG. 9 is a schematic diagram of division of layers of a first mesh model, according to one or more illustrative aspects described herein.

FIG. 10 depicts a comparison of a second mesh model generated by considering that a quantity of pixel points per unit length in a map after corner deformation is the same as a quantity of pixel points per unit length in the map before the corner deformation with a second mesh model generated in a case that maps before and after corner deformation using a known technique do not change.

DETAILED DESCRIPTION

Various aspects and solutions are described with reference to the accompanying drawings. The described aspects are illustrative, and are merely some rather than all possible aspects included within the spirit and scope of the described innovations.

Figure 1:
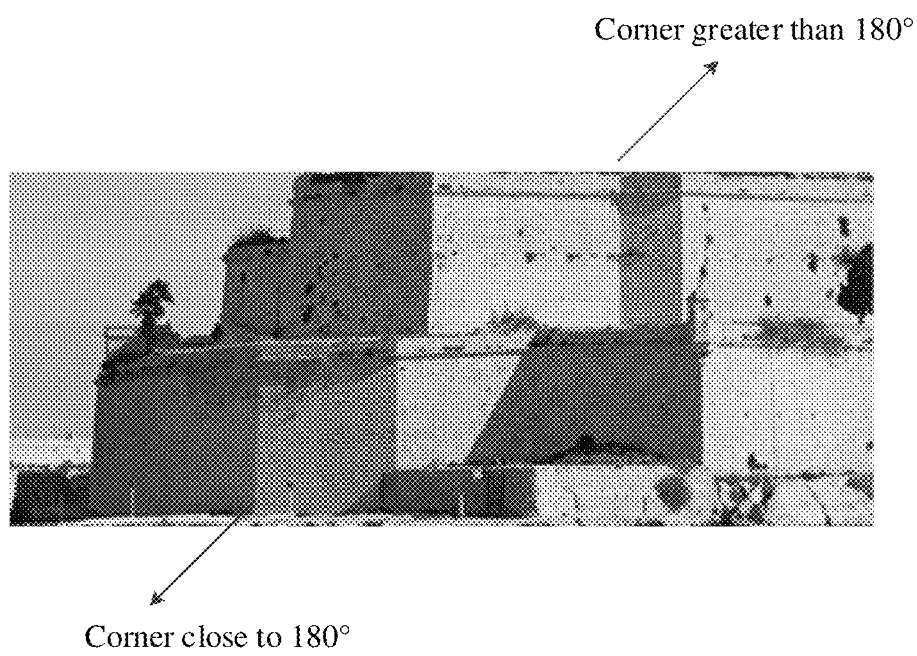
FIG. 1 is an image of the fortifications of Valletta in Malta, indicating illustrative corners.
Figure 2:
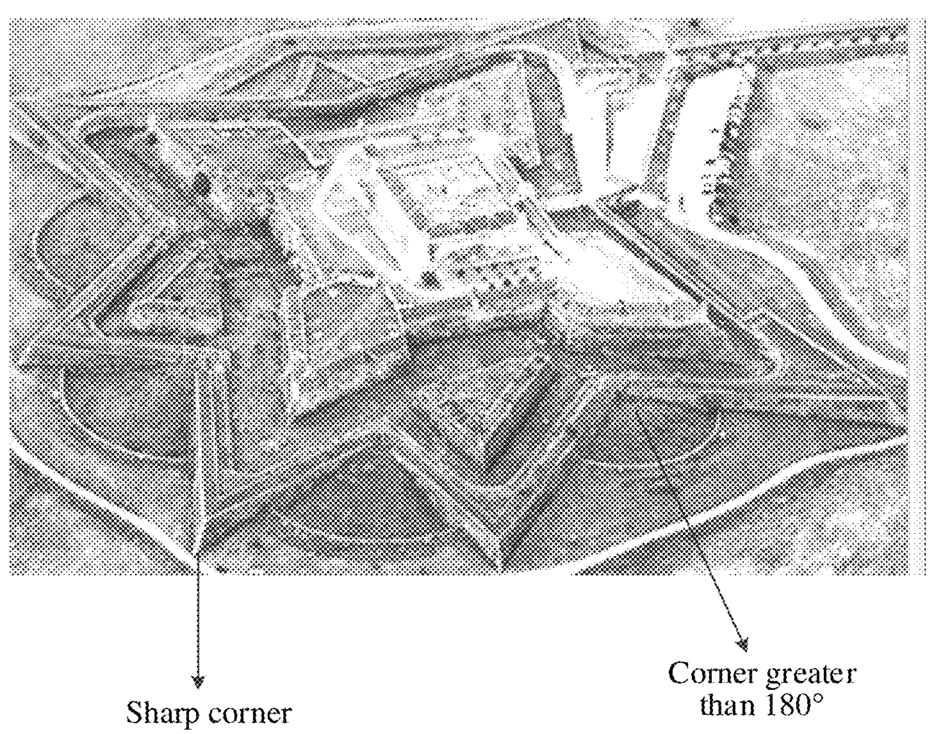
FIG. 2 is an overhead image of a star-shaped fortress with an internal building, indicating illustrative corners.

Under normal circumstances, buildings in both real life and gaming scenes have different shapes, and their splines may vary according to needs. An angle between two adjacent splines might not be a standard angle of 90°. For example, in the fortifications of Valletta in Malta as shown in FIG. 1, an example angle between two adjacent splines is an obtuse angle close to 180°, and an angle between two other adjacent splines is greater than 180°. As shown in FIG. 2, a star-shaped fortress of a building is also referred to as star fortress or prism fortress. A corner of a wall of the star-shaped fortress has a relatively sharp acute angle or an angle greater than 180°.

Generating a building may include the following: Firstly, several standardized wall modules are created and are then assembled and stacked according to any applicable rule and method to finally form a complete building. This idea can greatly increase the reuse rate. Furthermore, by using a set of mesh patches, different assembling and stacking methods can generate buildings with different shapes but relatively consistent styles. Under this idea, if walls on a building are thick, there is no perfect connection between the walls, and the walls need to be connected by adding corners. For example, as shown in FIG. 3, two thick walls are shown on the left hand side, and two walls connected by a corner are shown on the right hand side. Due to different shapes of buildings in both real life and gaming scenes, angles between two adjacent walls are often different. In order to increase the reuse rate of a building model, save art costs, and improve art production efficiency, people usually want to input a corner model with a corner at a standard angle (90°), and the corner is deformed into a specified angle between 0° and 180° through programming, thereby obtaining a corner model after corner deformation. That is, for a complex building, only a standard corner model needs to be created in the artistic aspect, and all models at other corners are automatically generated through deformation, so as to save art production costs and improve art production efficiency.

However, a Free-Form Deformation (FFD) method and a Lattice Deformer method for corner deformation are not suitable for use in architectural scenes at present. The FFD method, as a smooth and elastic transformation method, cannot ensure a rigid relationship on a static mesh in a deformation process. For example, as shown in FIG. 4, for a first target on a static mesh body, the first target on the static mesh body before corner deformation is shown on the left-hand side, and the first target on the static mesh body after corner deformation is shown on the right-hand side. According to the right-hand side as shown in FIG. 4, after corner deformation, a rigid relationship between the first target and a wall changes. The rigid relationship includes, but is not limited to: three points being collinear, two lines being parallel, four points being coplanar, two lines being perpendicular, and the like. Three points being collinear means that three points that are collinear on a mesh body before corner deformation still remain collinear after corner deformation. Two lines being parallel means that two lines that are parallel on a mesh body before corner deformation still remain parallel after corner deformation. Four point being coplanar means that two patches that are coplanar on a mesh body before corner deformation still remain coplanar after corner deformation. Two lines being perpendicular means that two lines that are perpendicular on a mesh body before corner deformation still remain perpendicular after corner deformation. Since the aforementioned rigid relationship cannot be kept between the first target and the wall, the first target is no longer perpendicular to the wall on the left hand side after corner deformation, and the first target is stretched.

At the same time, a connection surface between the corner and the wall is no longer perpendicular to the wall after corner deformation, which may cause a gap or overlapping between the corner and the wall geometrically. For example, according to a second target before corner deformation on the left-hand side as shown in FIG. 5, a connection surface between a corner and a wall is perpendicular to the wall, and the connection surface does not overlap the wall. After corner deformation, according to the second target after corner deformation on the right-hand side as shown in FIG. 5, the connection surface between the corner and the wall is no longer perpendicular to the wall, and the connection surface overlaps the wall. Similarly, the lattice deformer scheme and the FFD scheme have the same problems, and both the schemes will change the thickness of the wall after corner deformation. Therefore, the FFD method and the lattice deformer method are not applicable to corner deformation of buildings.

FFD is a deformation method that changes a shape of a model by pulling a control point. It is mainly to recalculate deformation of the shape of the model according to changes in the position of the control point before and after the control point is pulled. The lattice deformer method and the FFD method are the same, both of which change a shape of a model through a control point. A difference between the two methods lies in the different calculation processes and calculation methods of deformation.

Based on this, this application provides a mesh model processing scheme, in which, at least one numerical value determined before corner deformation on the basis of a positional relationship between a vector from a control point that controls the corner deformation to any vertex on a mesh body and a spline that passes through the control point is the same as at least one numerical value determined after corner deformation on the basis of the positional relationship between the vector from the control point that controls the corner deformation to any vertex on the mesh body and the spline that passes through the control point. It is equivalent that considering that after corner deformation, the mesh body still needs to satisfy the rigid relationship of three points being collinear, two lines being parallel, four points being coplanar, and two lines being perpendicular, it is conductive to achieving that a connection surface between a corner and a wall on the mesh body is perpendicular to the wall, the thickness of the wall does not change, and cracks and mutual overlapping may not occur between the corner and the wall.

It is understood that the scheme provided in this application may involve an artificial intelligence technology.

Artificial Intelligence (AI) involves a theory, a method, a technology, and an application system that use a digital computer or a machine controlled by the digital computer to simulate, extend, and expand human intelligence, sense an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The mesh model processing method provided in the embodiments of this application can be implemented by an AI method.

It is understood that the AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

With the research and progress of an AI technology, the AI technology has been studied and applied in many fields, such as common smart homes, smart wearable devices, virtual assistants, smart speakers, smart marketing, unmanned driving, automatic driving, unmanned aerial vehicles, robots, intelligent healthcare, and intelligent customer services. It is believed that with the development of the technology, the AI technology will be applied in more fields and play an increasingly important value.

Aspects described herein may relate to a computer vision (CV) technology in the AI technology. CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technology typically includes image processing, image recognition, image semantic comprehension, image retrieval, optical character recognition (OCR), video processing, video semantic comprehension, video content/behavior recognition, three-dimensional (3D) object reconstruction, 3D technology, virtual reality, augmented reality, and the like.

According to a mesh model processing method described herein, through the CV technology, functions related to image processing, image recognition, image semantic comprehension, image retrieval, OCR, video processing, video semantic comprehension, video content/behavior recognition, 3D object reconstruction, 3D technology, virtual reality, augmented reality, and the like, in the mesh model processing method are achieved.

Aspects described herein may also relate to Machine learning (ML) in the AI technology. ML is an interdisciplinary field, and relates to, e.g., probability theory, statistics, the approximation theory, convex analysis, and the algorithm complexity theory. ML specializes in studying how a computer simulates or implements human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

According to a mesh model processing method described herein, a mesh model can be trained using the ML technology.

Aspects described herein may also relate to the field of computer graphics. The computer graphics is a science that uses a mathematical algorithm to transform a two-dimensional or three-dimensional graph into a mesh form of a computer display. In brief, the main research content of the computer graphics is to study how to represent graphs in computers and study relevant principles and algorithms of using computers to perform computation, processing, and displaying of graphs.

Before further discussion of various aspects, the following explains relevant knowledge of this application.

1. A cloud technology is a hosting technology for unifying a series of resources such as hardware, software, and networks in a wide area network or a local area network to achieve computation, storage, processing and sharing of data. The cloud technology is a general name of a network technology, an information technology, an integration technology, a management platform technology, an application technology and the like and applied on the basis of a cloud computing business mode, can form a resource pool for on-demand use, and is flexible and convenient. A cloud computing technology will become an important support. Background services of a technical network system require a large amount of computing and storage resources, for example, video websites, picture websites, and more portal websites. With high development and application of the Internet industry, each item will have its own identifier in the future, and the identifiers need to be transmitted to a background system for logical processing. Data at different levels will be processed separately. All types of industry data require strong system support. This can only be achieved through cloud computing.

2. Cloud gaming, also referred to as gaming on demand, is an online gaming technology based on a cloud computing technology. The cloud gaming technology enables thin clients with relatively limited graphics processing and data computing capabilities to run high-quality games. In a cloud gaming scene, the game is not run on a game terminal of a player, but on a cloud server. The cloud server renders the gaming scene as video and audio streams and transmits the video and audio streams to the game terminal of the player through a network. The game terminals do not need to have strong graphic operation and data processing capabilities, but only needs to have a basic streaming media playing capability and a capability for obtaining instructions inputted by the player and sending the commands to the cloud server.

3. Distance maintenance: That is, before and after corner deformation, a distance between some points on a mesh model remains unchanged.

4. Angle maintenance: That is, before and after corner deformation, an angle between some line segments on a mesh model remains unchanged.

Aspects described herein may be used with or for, but are not limited to, construction of buildings in virtual scenes such as 3D games/3D film and television works/short videos. For example, aspects described herein are applicable to effect conversion from a standard building corner to a specific building corner in a 3D gaming scene. For buildings with different shapes but relatively consistent styles in the gaming scene, using aspects described herein can save production and rendering costs of game pictures, and a mesh model obtained using the mesh model processing techniques described herein is kept in a rigid relationship before and after corner deformation, so that the mesh model after corner deformation is more realistic and improves the gaming experience of a user in a game.

Innovative aspects described herein are explained further below.

Figure 6:
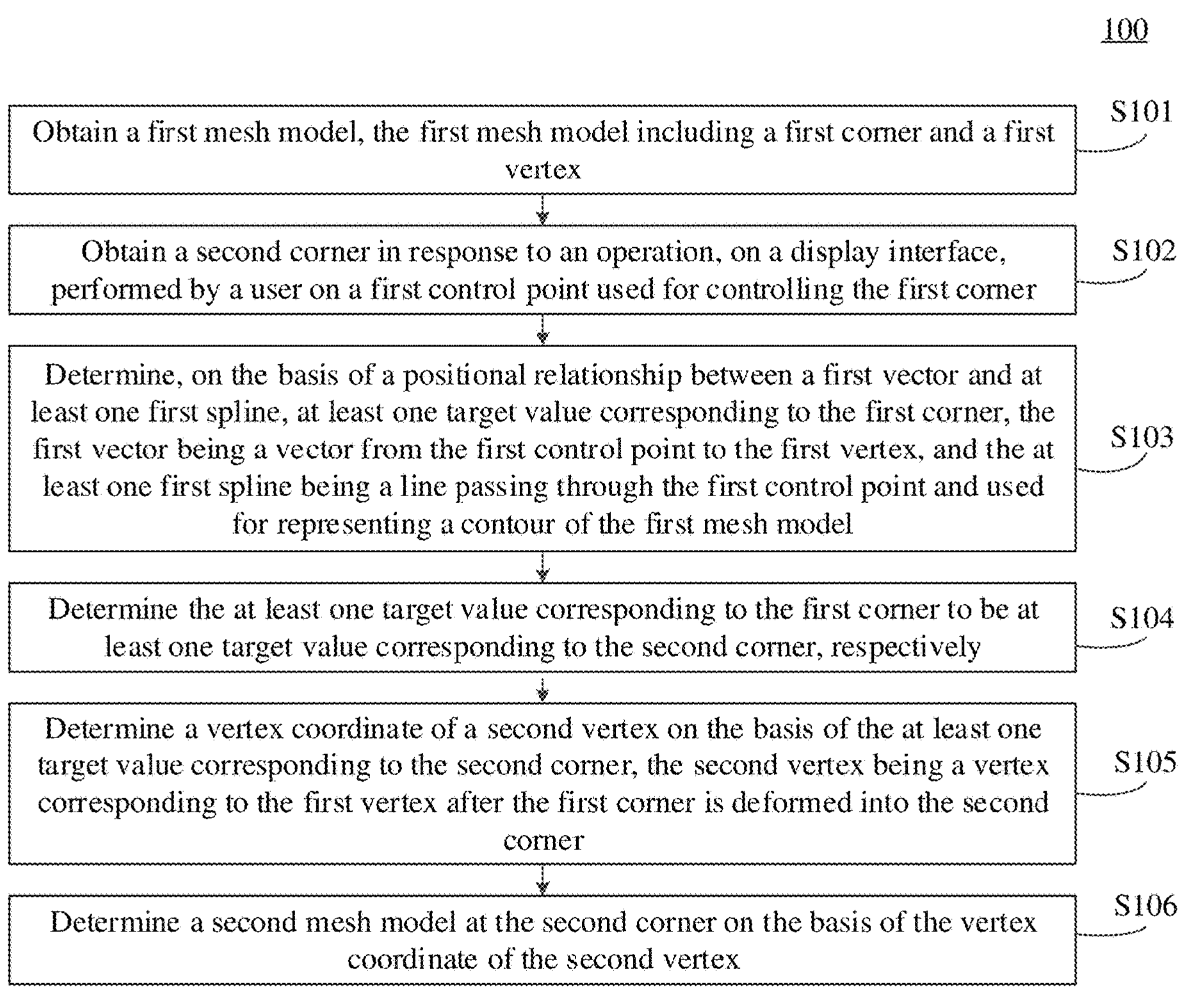
FIG. 6 is a flowchart of a mesh model processing method according to one or more illustrative aspects described herein.

FIG. 6 is a flowchart of an illustrative mesh model processing method 100.

The mesh model processing method 100 can be performed by any electronic device with a data processing capability. The electronic device can be a terminal device, including but not limited to a mobile phone, a tablet, a laptop, a handheld computer, a mobile internet device (MID), or another terminal device with a display function. The electronic device can also be a server. The server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms.

A mesh model processing apparatus is taken as an example to explain a mesh model processing device below.

As shown in FIG. 6, the method 100 may include part or all of the following contents:

S101: Obtain a first mesh model, the first mesh model including a first corner and a first vertex;

S102: Obtain a second corner in response to an operation, on a display interface, performed by a user on a first control point used for controlling the first corner;

S103: Determine, on the basis of a positional relationship between a first vector and at least one first spline, at least one target value corresponding to the first corner, the first vector being a vector from the first control point to the first vertex, and the at least one first spline being a line passing through the first control point and used for representing a contour of the first mesh model;

S104: Determine the at least one target value corresponding to the first corner to be at least one target value corresponding to the second corner, respectively;

S105: Determine a vertex coordinate of a second vertex on the basis of the at least one target value corresponding to the second corner; and the second vertex being a vertex corresponding to the first vertex after the first corner is deformed into the second corner; and S106: Determine a second mesh model at the second corner on the basis of the vertex coordinate of the second vertex.

In some aspects, a first mesh model created by a user with 3D modeling software is obtained, and a first corner is transformed into a second corner in response to a dragging operation performed by the user on a first control point on a display interface. For example, an angle of the first corner before dragging may be 90°, and an angle of the second corner after dragging may be any angle between 0° and 180°. Of course, the angle of the first corner can also be any angle between 0° and 180°, and this application does not make specific limitations on this.

In other aspects, a user selects a first control point and inputs an angle of a second corner to obtain the second corner.

The first vertex may be any vertex on the first mesh model.

The at least one target value corresponding to the first corner may be determined to be the at least one target value corresponding to the second corner, respectively, and the vertex coordinate of the second vertex may be determined on the basis of the at least one target value corresponding to the second corner. After the first corner is deformed into the second corner, the positional relationship between the first vector at the first corner and the at least one first spline is the same as the positional relationship between the second vertex at the second corner and the spline that passes through the control point used for controlling the second corner. Further, it is desirable that a connection surface between the second corner on a second mesh model and a wall on the second mesh model is still perpendicular to the wall, a thickness of the wall on the second mesh model is the same as a thickness of a wall on a first mesh model, and cracks or interpenetrating may not occur between the second corner on the second mesh model and the wall on the second mesh model.

In addition, compared to the FFD method and the lattice deformer method, aspects described herein can generate the second mesh model at the second corner by performing the operation, on the display interface, on the first control point used for controlling the first corner, so that there are few operation steps of the user, and use is simple and convenient. Furthermore, in the schemes of this application, a corner of the first mesh model can be deformed in any angle between 0° and 180° to obtain a mesh model with any corner, which increases the reuse rate of a model, saves art costs, and improves art production efficiency.

One benefit of using a mesh model processing scheme described herein is that, by only inputting one mesh model, the corner of the first mesh model can be deformed at any angle between 0° and 180° to obtain a mesh model with any corner. Therefore, for the buildings with different shapes but relatively consistent styles in the gaming scene, using a mesh model processing scheme described herein does not need to construct mesh models with the same corner at different angles, which improves the reuse rate of a mesh model in a gaming scene and saves on production and rendering costs of game pictures. Another benefit of aspects described herein is that the mesh model after corner deformation of the building in the gaming scene will not have deformation, interpenetrating, cracks, and the like, so that the play experience of a user in a game is improved.

Figure 7:
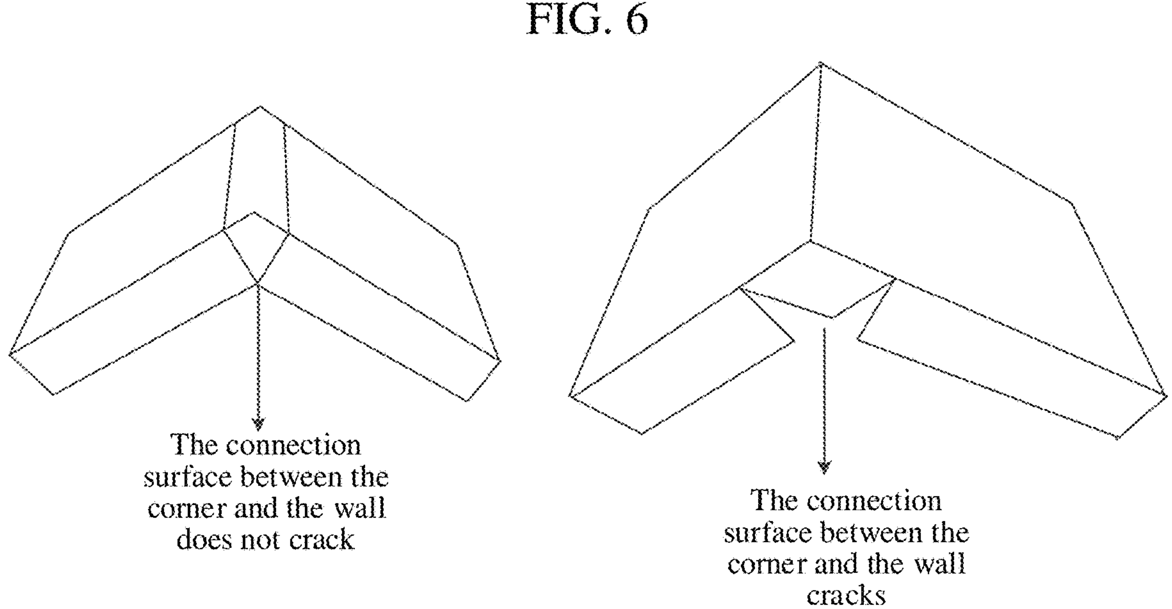
FIG. 7 depicts a comparison of a second mesh model generated by considering that a positional relationship between a first vector and at least one first spline does not change before and after corner deformation with a second mesh model generated without considering that the positional relationship does not change, based on a prior art technique.

FIG. 7 depicts a comparison of a second mesh model generated by considering that a positional relationship between a first vector and at least one first spline does not change before and after corner deformation with a second mesh model generated without considering that the positional relationship does not change in the existing FFD scheme. As shown in FIG. 7, the second mesh model generated by considering that the positional relationship between the first vector and the at least one first spline does not change before and after corner deformation is shown on the left-hand side. A connection surface between a corner on the second mesh model and a wall on the second mesh model does not crack and is perpendicular to the wall. The second mesh model generated without considering that the positional relationship between the first vector and the at least one first spline does not change before and after corner deformation in the existing scheme is shown on the right-hand side. A connection surface between a corner on the second mesh model and a wall on the second mesh model cracks and is not perpendicular to the wall.

According to an aspect, S103 may include:

determining a modulus of a first component of the first vector within a first horizontal plane to be a first target value on the basis of the positional relationship between the first vector and the at least one first spline, where the first component is a component perpendicular to a spline, close to the first vertex, among the at least one first spline; the at least one first spline is a plurality of first splines; the first horizontal plane is a horizontal plane formed by the plurality of first splines; and the at least one target value corresponding to the first corner includes the first target value.

For example, FIG. 8 is an example of at least one target value corresponding to a first corner on a mesh model. As shown in FIG. 8, it is assumed that $P_0$ is the first control point used for controlling the first corner; $P_1$ is the first vertex on the first mesh model; $x_1$ and $x_2$ represent the at least one first spline passing through $P_0$, where $x_2$ represents the spline close to the first vertex $P_1$; a vector $\vec{V}$ from $P_0$ to $P_1$ represents the first vector; and $\vec{N}$ is the component of the first vector $\vec{V}$ perpendicular to the spline $x_2$ within the first horizontal plane formed by the splines $x_1$ and $x_2$.

The modulus of the component $\vec{N}$ of the first vector within the first horizontal plane is determined to be the first target value, which is equivalent to dividing the first mesh model into a left part and a right part using an angular bisector of the at least one first spline during the determination of the first target value. A modulus of the component of the first vector perpendicular to a spline corresponding to the mesh model where the first vector after division is located is calculated.

According to an aspect, there are no specific limitations on the component of the first vector in the direction of the spline, close to the first vertex, among the at least one first spline and the component of the first vector perpendicular to the first horizontal plane.

The modulus of the first component of the first vector within the first horizontal plane is determined to be the first target value, which is equivalent to considering that when the wall on the first mesh model has a thickness, a thickness of the wall on the second mesh model at the second corner must not change after the first corner is deformed into the second corner. That is, the first target value at the first corner and the first target value at the second corner are the same, which are used to calculate a vertex coordinate of the second vertex. It can be ensured that the thickness of the wall on the first mesh model is the same as the thickness of the wall on the second mesh model, so that the second corner and wall on the second mesh model can be seamlessly connected at the second corner.

In some aspects, S103 may include:

determining a modulus of a component of the first vector perpendicular to a first horizontal plane to be a second target value on the basis of the positional relationship between the first vector and the at least one first spline, where the at least one first spline is a plurality of first splines; the first horizontal plane is a horizontal plane formed by the plurality of first splines; and the at least one target value corresponding to the first corner includes the second target value.

Illustratively, as shown in FIG. 8, it is assumed that $P_0$ is the first control point used for controlling the first corner; $P_1$ is the first vertex on the first mesh model; $x_1$ and $x_2$ represent the at least one first spline passing through $P_0$, where $x_2$ represents the spline close to the first vertex; a vector $\vec{V}$ from $P_0$ to $P_1$ represents the first vector; and $\vec{H}$ is the component of the first vector $\vec{V}$ perpendicular to the first horizontal plane formed by $x_1$ and $x_2$.

According to some aspects, there might be no specific limitations on the component of the first vector perpendicular to the spline, close to the first vertex, among the at least one first spline within the first horizontal plane and the component of the first vector in the direction of the spline, close to the first vertex, among the at least one first spline.

The modulus of the component of the first vector perpendicular to the first horizontal plane is determined to be the second target value, and the second target value at the first corner is determined to be the second target value at the second corner, so that the height of the second corner remains unchanged after the first corner is deformed into the second corner. Due to the constant height of the second corner, it is ensured that the connection surface between the second corner and the wall is still perpendicular to the wall, that is, there will be no fault between the corner and the connection surface.

In some aspects, S103 may include:

determining a ratio of a modulus of a component of the first vector in a first direction to a first cotangent value to be a third target value on the basis of the positional relationship between the first vector and the at least one first spline, where the first direction is a direction of a spline, close to the first vertex, among the at least one first spline; the at least one first spline is two splines; the first cotangent value is a cotangent value of a half angle of a smallest angle between the two splines; and the at least one target value corresponding to the first corner includes the third target value.

Illustratively, as shown in FIG. 8, it is assumed that $P_0$ is the first control point used for controlling the first corner; $P_1$ is the first vertex on the first mesh model; $x_1$ and $x_2$ represent the at least one first spline passing through $P_0$, where $x_2$ represents the spline close to the first vertex; a vector $\vec{V}$ from $P_0$ to $P_1$ represents the first vector; and $\vec{T}$ is the component of the first vector $\vec{V}$ in the direction of the spline $x_2$.

According to some aspects, there might be no specific limitations on the component of the first vector perpendicular to the spline, close to the first vertex, among the at least one first spline within the first horizontal plane and the component of the first vector perpendicular to the first horizontal plane.

The ratio of the modulus of the component of the first vector in the first direction to be the first cotangent value is determined to be the third target value corresponding to the first corner, and the third target value corresponding to the first corner is determined to be the third target value corresponding to the second corner. On the one hand, it can be ensured that there will be no crack between the second corner and the wall. On the other hand, since the first cotangent value is determined to be the cotangent value of the half angle of the smallest angle between the two splines during the calculation of the third target value, it can achieve that after the first corner is deformed into the second corner, there will be no interpenetrating or overlapping between the second corner and the wall.

In some aspects, the at least one target value corresponding to the second corner is determined on the basis of a positional relationship between the second vector and at least one second spline; the second vector is a vector from a second control point used for controlling the second corner to the second vertex; and the at least one second spline is a line passing through the second control point and used for representing a contour of the second mesh model.

Based on this, S105 may include:

calculating the vertex coordinate of the second vertex on the basis of a position of the at least one second spline, a position of the second control point, and the at least one target value corresponding to the second corner.

Illustratively, the at least one target value corresponding to the second corner is determined on the basis of the positional relationship between the second vector and the at least one second spline, which can be understood as follows: the at least one target value corresponding to the second corner is: a target value that can reflect the positional relationship between the second vector and the at least one second spline.

The at least one target value corresponding to the first corner is determined to be the at least one target value corresponding to the second corner, respectively, and the vertex coordinate of the second vertex is determined on the basis of the at least one target value corresponding to the second corner, so that it can be ensured that the calculated vertex coordinate of the second vertex satisfy a first condition. The first condition may be that the positional relationship between the first vector and the at least one first spline is the same as the positional relationship between the second vector and the at least one second spline.

During the calculation of the second mesh model at the second corner, the mesh model processing method provided in this application may ensure that the positional relationship between the first vector on a static mesh and the at least one first spline remains unchanged. Contrarily, the FFD method implemented in Autodesk 3ds Max only focuses on geometric deformation of a vertex and does not recalculate UV coordinates of the vertex. As a result, after corner deformation, a map corresponding to a new mesh model is stretched or compressed. If the map is a regular texture map, this problem will be very obvious. For example, as shown in FIG. 4, for a third target on a static mesh body, the third target on the static mesh body before corner deformation is shown on the left-hand side, and the third target on the static mesh body after corner deformation is shown on the right-hand side. According to the right hand side as shown in FIG. 4, after corner deformation, the third target is stretched.

Based on this, the mesh model processing techniques described herein not only consider that the positional relationship between the first vector and the at least one first spline on the static mesh model does not change before and after corner deformation, but also recalculates the UV coordinates of the vertex on the second mesh model in the map, so that the connection surface between the corner on the second mesh model and the wall on the second mesh model is perpendicular to the wall, the thickness of the wall does not change, and the map at the corner is not stretched, misaligned, twisted, and/or broken on the basis of no crack and mutual overlapping between the corner and the wall.

The following is a detailed explanation of how to calculate the UV coordinates in the second map and how to generate the second mesh model in combination with the vertex coordinate on the second mesh model:

In some aspects, S106 may include:

dividing the first mesh model into a plurality of layers on the basis of geometric heights of a plurality of vertexes on the first mesh model;

determining a first horizontal distance between the first vertex and a third vertex in a first map, the first map being a map corresponding to the first mesh model, the plurality of vertexes including the third vertex, and the third vertex and the first vertex being on a same layer among the plurality of layers;

determining a quantity of pixel points per unit length on the first horizontal distance on the basis of the first horizontal distance;

determining the quantity of the pixel points per unit length on the first horizontal distance to be a quantity of pixel points on a second horizontal distance per unit length, the second horizontal distance being a horizontal distance from the second vertex to a fourth vertex in a second map, the fourth vertex being a vertex corresponding to the third vertex after the first corner is deformed into the second corner, and the second map being a map corresponding to the second mesh model;

determining the quantity of the pixel points per unit length on the second horizontal distance to be a U coordinate of the second vertex in the second map; and determining the second mesh model at the second corner on the basis of the U coordinate of the second vertex in the second map and the vertex coordinate of the second vertex.

In some aspects, vertexes with adjacent geometric heights in the first mesh models are divided to a same layer on the basis of an angular bisector of the first corner, to obtain the plurality of layers.

In other aspects, the first mesh model is divided into two third mesh models on the basis of an angular bisector of the first corner; and vertexes with adjacent geometric heights in the third mesh models are divided to a same layer to obtain the plurality of layers. Illustratively, as shown in FIG. 9, the first mesh model is divided into two parts using the angular bisector of the first corner. For the third mesh model on the left hand side, vertex $P_0$ and vertex $P_1$ on the third mesh model are two vertexes belonging to the same layer; and vertex $P_1$ and vertex $P_2$ are two vertexes belonging to the same layer, where a corresponding coordinate of $P_0$ in the map is $(U_0, V_0)$, and a corresponding coordinate of $P_1$ in the map is $(U_1, V_1)$; and a corresponding coordinate of $P_2$ in the map is $(U_2, V_2)$.

Before the layer division, the first mesh model is equally divided into the two third mesh models first using the angular bisector of the first corner; each third mesh model is then subjected to the layer division; and the vertex coordinate at the second corner is calculated for each third mesh model, so that maps between the second corner and the two walls connected to the second corner are seamlessly spliced, and no breakage or misalignment will occur between the maps.

In some aspects, the third vertex may be any vertex on the same layer with the first vertex. The third vertex may be different from the first vertex.

Because the deformation of the first corner is only scaling in a horizontal direction of the first corner, but the first corner will not change in a vertical direction of the first corner, during the recalculation of the UV coordinates corresponding to each vertex on the second mesh model in the second map, only the U coordinate of each vertex in the second map needs to be calculated. The V coordinate of each vertex in the second map is the same as the V coordinate of the vertex in the first map. The V coordinate of each vertex in the first map is the same as the V coordinate of the vertex in the second map, so that the maps between the second corner and the two walls connected to the second corner in the second map can be spliced together.

Firstly, the third vertex is determined to be a vertex at the same layer with the first vertex, which is equivalent to considering a geometric size of a horizontal line segment on a corner is usually only approximately proportional to a UV size in a map and not exactly the same numerically. If vertexes at different layers are calculated together and affect each other, maps of some triangular patches below the second corner may be stretched or twisted.

Secondly, the quantity of the pixel points per unit length on the first horizontal distance is determined to be the quantity of the pixel points per unit length on the second horizontal distance, so that in the layer with the first vertex, horizontal parts of the first vertex and the third vertex in the first map may not be stretched, broken, or misaligned in the second map, thereby ensuring that the maps on each layer in the second map may not be stretched, broken, or misaligned.

Because the mesh model processing scheme described herein considers that a texture map on a mesh model cannot be stretched, broken, or misaligned before and after corner deformation, when the mesh model processing scheme of this application is applied to constructing a gaming scene, textures of buildings in the gaming scene are more in line with the gaming scene and are more lifelike, which is conductive to improving the playing effect of a 3D game and then improving the user experience.

FIG. 10 depicts a comparison of a second mesh model generated by considering that a quantity of pixel points per unit length in a map after corner deformation is the same as a quantity of pixel points per unit length in the map before the corner deformation with a second mesh model generated in a case that maps before and after corner deformation in the existing scheme do not change. As shown in FIG. 10, the second mesh model generated by considering that a quantity of pixel points per unit length in a map after corner deformation is the same as a quantity of pixel points per unit length in the map before the corner deformation is shown on the left-hand side, and the map on the second mesh model is not stretched or twisted. The second mesh model generated in a case that the map before and after corner deformation does not change is shown on the right-hand side. The map on the second mesh model is stretched and deformed and has a crack.

In addition, according to an aspect, the first mesh model is divided into the layers, and is applicable to a multi-layer wall-corner model, a wall-corner model with an inclined surface, and a wall-corner model with both a multi-layer structure and an inclined surface.

Figure 11:
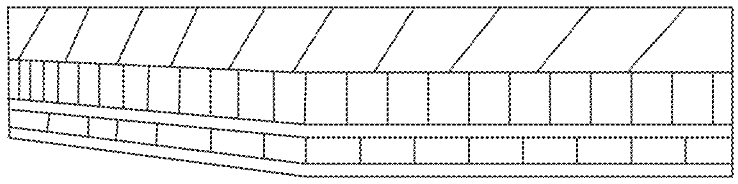
FIG. 11 depicts an effect after corner deformation on a multi-layer wall-corner model, according to one or more illustrative aspects described herein.
Figure 12:
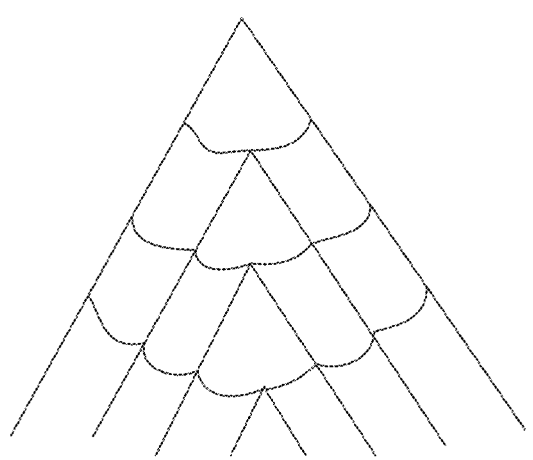
FIG. 12 depicts an effect after corner deformation on a wall-corner model with an inclined surface, according to one or more illustrative aspects described herein.
Figure 13:
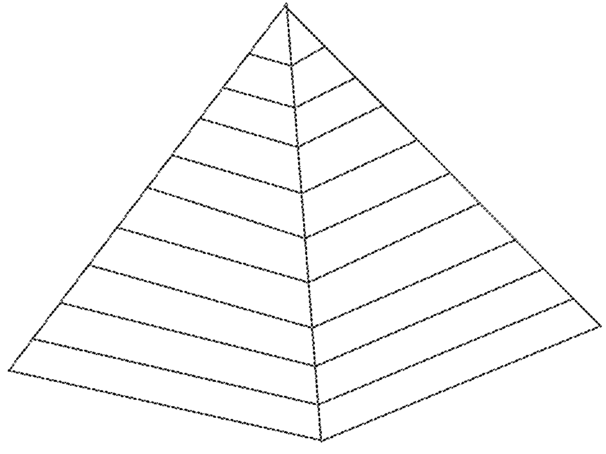
FIG. 13 depicts an effect after corner deformation on a wall-corner model with both a multi-layer structure and an inclined surface, according to one or more illustrative aspects described herein.

As shown in FIG. 11 to FIG. 13, the mesh model processing techniques described herein may be used to deform a corner of the multi-layer wall-corner model, a corner of the wall-corner model with the inclined surface, and the wall-corner model with both the multi-layer structure and the inclined surface, so that all generated mesh models can be kept in intact states, without stretching, breakage, twisting, and misalignment.

Although different layers in the second map may be misaligned, this misalignment is within an acceptable range. Moreover, if a horizontal geometric size between two vertexes of different layers on a corner is relatively close to their corresponding U sizes in the map, the misalignment, in the second map, between map parts corresponding to patches where the two vertexes are located will be relatively small.

In some aspects, the quantity of the pixel points per unit length on the first horizontal distance may be determined in the following way:

- determining a first projection of a vector from the first vertex to the third vertex on the spline, close to the first vertex, among the at least one first spline; and
- determining a ratio of the first horizontal distance to the first projection to be the quantity of the pixel points per unit length on the first horizontal distance. In this embodiment, Due to the fact that in the process of deformation from the first corner to the second corner, a horizontal distance between two vertexes of the same layer in a map and a geometric horizontal distance between the two vertexes in a direction of a spline that passes through a control point used for controlling the corner are always in proportion, the ratio of the first horizontal distance to the first projection is determined to be the quantity of the pixel points per unit length on the first horizontal distance, so as to avoid the maps of the patches where the two vertexes of the same layer from being stretched, broken, twisted, or misaligned in the process of deformation from the first corner to the second corner.

In some aspects, the U coordinate of the second vertex in the second map may be calculated in the following way:

- determining a second projection of a vector from the second vertex to the fourth vertex on a spline, close to the second vertex, among the at least one second spline, the at least one second spline being a line passing through the second control point used for controlling the second corner, and the spline being used for representing a contour of the second mesh model;
- determining a product of the second projection and the quantity of the pixel points per unit length on the second horizontal distance to be the second horizontal distance from the second vertex to the fourth vertex in the second map; and
- calculating the U coordinate of the second vertex in the second map on the basis of the second horizontal distance and a U coordinate of the fourth vertex in the second map.

In one illustrative aspect, if the third vertex is a vertex located in the layer with the first vertex and farthest from the first control point in the direction of the spline, close to the first vertex, among the at least one first spline, the U coordinate of the fourth vertex in the second map may be the same as the U coordinate of the third vertex in the first map.

In another illustrative aspect, if the third vertex is not in the layer with the first vertex and is not farthest from the first control point in the direction of the spline, close to the first vertex, among the at least one first spline, the U coordinate of the fourth vertex in the second map may be calculated in the following way:

- first determining a fifth vertex in the layer with the first vertex, the fifth vertex being farthest from the first control point in the direction of the spline, close to the first vertex, among the at least one first spline;
- determining a quantity of pixel points per unit length on a horizontal distance between the third vertex and the fifth vertex in the first map; and
- determining the U coordinate of the fourth vertex in the map on the basis of the fact that the quantity of the pixel points per unit length on the horizontal distance between the third vertex and the fifth vertex in the first map is the same as a quantity of pixel points per unit length on a horizontal distance between the fourth vertex and a sixth vertex in the second map and the fact that a U coordinate of the fifth vertex in the first map is the same as a U coordinate of the sixth vertex in the second map.

The sixth vertex is a vertex corresponding to the fifth vertex after the first corner is deformed into the second corner.

In some aspects, after the U coordinate of the second vertex is determined, the second mesh model may be determined as follows:

- determining a V coordinate of the first vertex in the first map to be a V coordinate of the second vertex in the second map; and
- performing linear superposition processing on the UV coordinates of the second vertex in the second map and the vertex coordinate of the second vertex, and determining the second mesh model.

Figure 14:
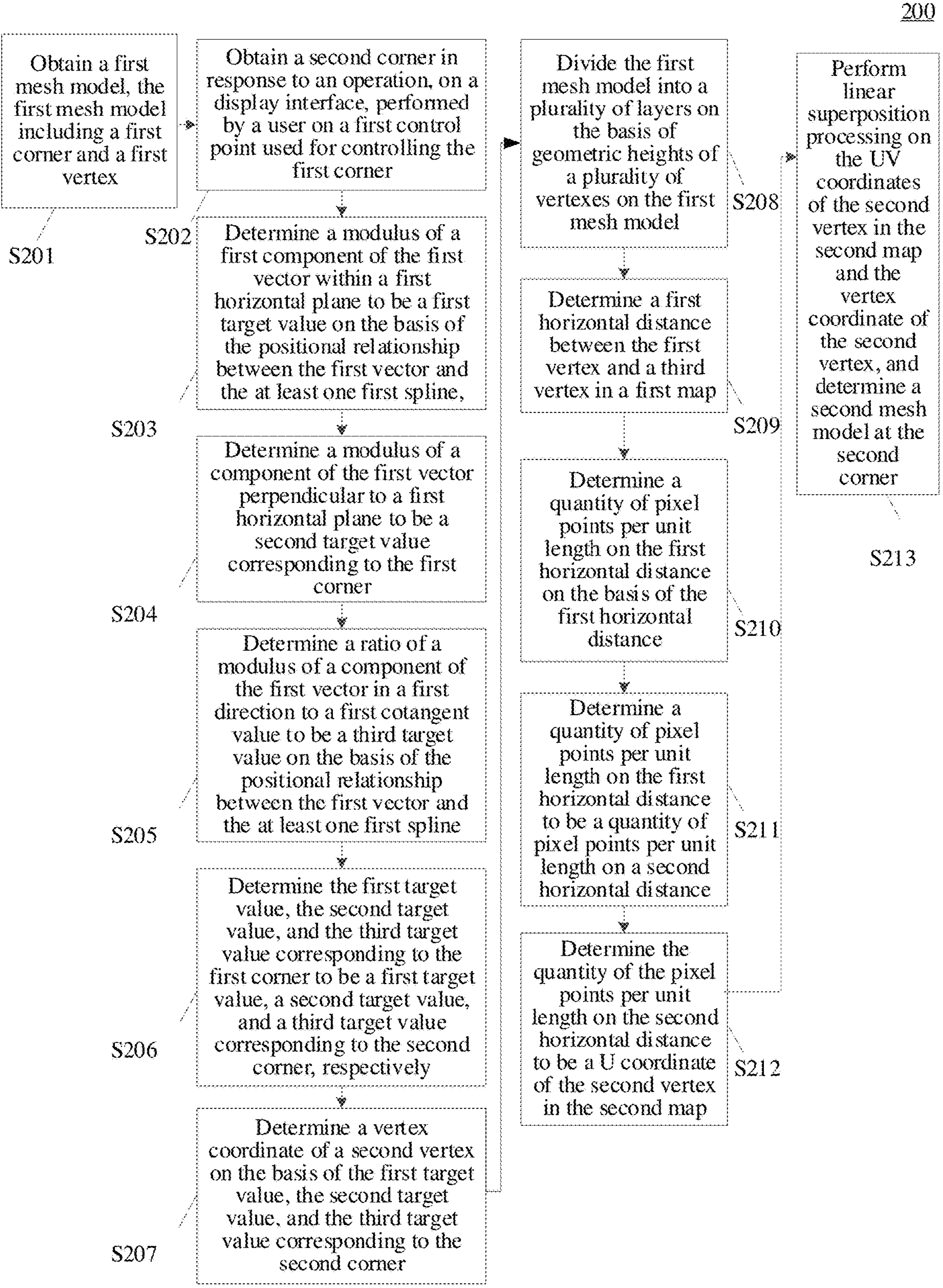
FIG. 14 is a flowchart of a mesh model processing method according to one or more illustrative aspects described herein.

FIG. 14 is a flowchart of a mesh model processing method 200.

As shown in FIG. 14, the method 200 may include part or all of the following contents:

S201: Obtain a first mesh model, the first mesh model including a first corner and a first vertex.

S202: Obtain a second corner in response to an operation, on a display interface, performed by a user on a first control point used for controlling the first corner.

S203: Determine a modulus of a first component of the first vector within a first horizontal plane to be a first target value on the basis of the positional relationship between the first vector and the at least one first spline.

The first vector is a vector from the first control point to the first vertex; the first component is a component perpendicular to a spline, close to the first vertex, among the at least one first splines; and the at least one first spline is a line that passes through the first control point and is used for representing a contour of the first mesh model. The at least one first spline is a plurality of first splines; the first horizontal plane is a horizontal plane formed by the plurality of first splines; and the at least one target value corresponding to the first corner includes the first target value.

S204: Determine, on the basis of the positional relationship between the first vector and the at least one first spline, a modulus of a component of the first vector perpendicular to a first horizontal plane to be a second target value corresponding to the first corner.

The at least one target value corresponding to the first corner includes the second target value.

S205: Determine a ratio of a modulus of a component of the first vector in a first direction to a first cotangent value to be a third target value on the basis of the positional relationship between the first vector and the at least one first spline.

The first direction is a direction of a spline, close to the first vertex, among the at least one first spline; the at least one first spline is two splines; the first cotangent value is a cotangent value of a half angle of a smallest angle between the two splines; and the at least one target value corresponding to the first corner includes the third target value.

S206: Determine the first target value, the second target value, and the third target value corresponding to the first corner to be a first target value, a second target value, and a third target value corresponding to the second corner, respectively.

S207: Determine a vertex coordinate of a second vertex on the basis of the first target value, the second target value, and the third target value corresponding to the second corner.

S208: Divide the first mesh model into a plurality of layers on the basis of geometric heights of a plurality of vertexes on the first mesh model.

S209: Determine a first horizontal distance between the first vertex and a third vertex in a first map.

The first map is a map corresponding to the first mesh model. The third vertex is a vertex located in the layer with the first vertex and farthest to the first control point in the direction of the spline, close to the first vertex, among the at least one first spline, and a U coordinate corresponding to the third vertex in the first map is the same as a U coordinate corresponding to the fourth vertex in the second map.

S210: Determine a quantity of pixel points per unit length on the first horizontal distance on the basis of the first horizontal distance.

S211: Determine a quantity of pixel points per unit length on the first horizontal distance to be a quantity of pixel points per unit length on a second horizontal distance.

The second horizontal distance is a horizontal distance from the second vertex to a fourth vertex in a second map. The fourth vertex is a vertex corresponding to the third vertex after the first corner is deformed into the second corner. The second map is a map corresponding to the second mesh model.

S212: Determine the quantity of the pixel points per unit length on the second horizontal distance to be a U coordinate of the second vertex in the second map.

A V coordinate of the second vertex in the second map is the same as a V coordinate of the first vertex in the first map.

S213: Perform linear superposition processing on the UV coordinates of the second vertex in the second map and the vertex coordinate of the second vertex, and determine a second mesh model at the second corner.

In aspects using the method of FIG. 14, during recalculation of the vertex coordinate at the second corner, the first target value, the second target value, and the third target value at the first corner are determined on the basis of the positional relationship between the first vector and the at least one first spline. On the one hand, it can be ensured that a thickness of a wall on the first mesh model is the same as a thickness of a wall on the second mesh model, so that at the second corner, the second corner on the second mesh model and the wall on the second mesh model can be seamlessly connected. On the other hand, after the first corner is deformed into the second corner, due to the constant height of the second corner, it is ensured that the connection surface between the second corner and the wall is still perpendicular to the wall, that is, there will be no fault between the corner and the connection surface. Furthermore, cracks, interpenetrating, and overlapping will not occur between the second corner and the wall.

In addition, during recalculation of the UV coordinates corresponding to each vertex on the second mesh model, the quantity of the pixel points per unit length on the first horizontal distance is determined to be the quantity of the pixel points per unit length on the second horizontal distance, so that in the layer with the first vertex, horizontal parts of the first vertex and the third vertex in the first map may not be stretched, broken, or misaligned in the second map, thereby ensuring that the maps on each layer in the second map may not be stretched, broken, or misaligned.

Various innovative aspects are described in detail above with reference to the accompanying drawings. However, the present disclosure is not limited to the specific details in the foregoing implementations, various simple transformations may be made to the technical solutions of the present disclosure within a range of the technical concept of the present disclosure, and these simple transformations fall within the protection scope of the present disclosure. For example, the respective specific technical features described in the foregoing specific implementations may be combined in any proper manner without conflicts. In order to avoid unnecessary repetitions, the present disclosure will not additionally describe various possible combination manners. For another example, various different implementations of the present disclosure may also be arbitrarily combined without departing from the idea of the present disclosure, and these combinations shall still be regarded as content disclosed in the present disclosure.

It is also understood that in the various method embodiments of this application, an order of sequence numbers of the foregoing processes does not indicate an execution sequence, and execution sequences of the processes should be determined according to functions and internal logics thereof and should not impose any limitation on an implementation process of the embodiments of this application.

The methods provided in the various aspects described herein are explained above. An apparatus provided in the embodiments of this application will be explained below.

Figure 15:
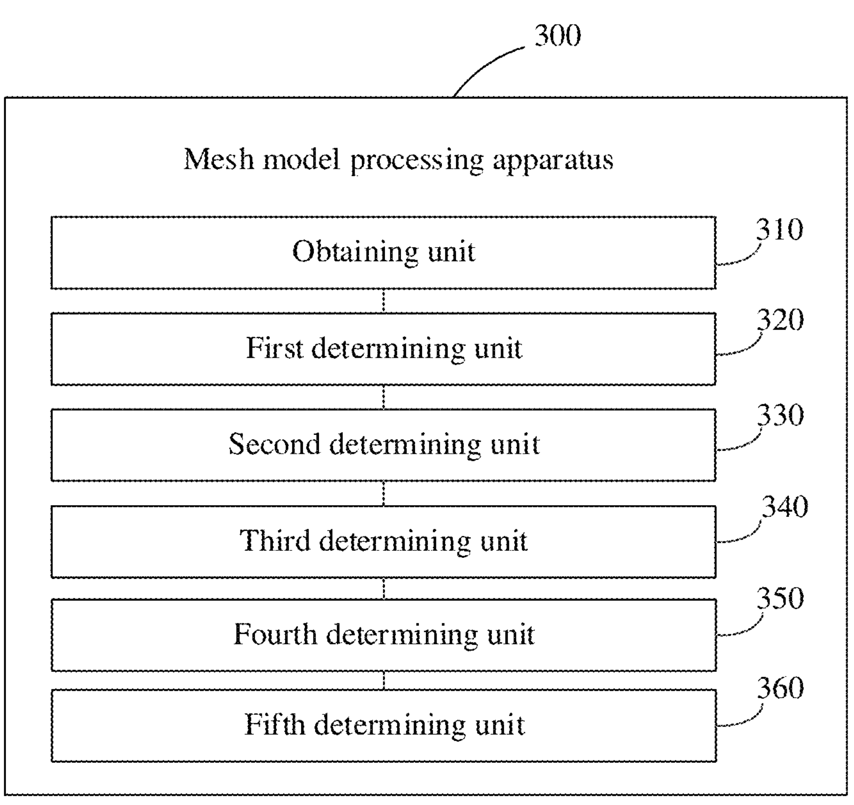
FIG. 15 is a schematic block diagram of a mesh model processing apparatus according to one or more illustrative aspects described herein.

FIG. 15 is a schematic block diagram of an illustrative mesh model processing apparatus 300.

As shown in FIG. 15, the mesh model processing apparatus 300 may include:

- an obtaining unit 310, configured to obtain a first mesh model, the first mesh model including a first corner and a first vertex;
- a first determining unit 320, configured to obtain a second corner in response to an operation, on a display interface, performed by a user on a first control point used for controlling the first corner;
- a second determining unit 330, configured to determine, on the basis of a positional relationship between a first vector and at least one first spline, at least one target value corresponding to the first corner, the first vector being a vector from the first control point to the first vertex, and the at least one first spline being a line passing through the first control point and used for representing a contour of the first mesh model;
- a third determining unit 340, configured to determine the at least one target value corresponding to the first corner to be at least one target value corresponding to the second corner, respectively;
- a fourth determining unit 350, configured to determine a vertex coordinate of a second vertex on the basis of the at least one target value corresponding to the second corner, the second vertex being a vertex corresponding to the first vertex after the first corner is deformed into the second corner; and a fifth determining unit 360, configured to determine a second mesh model at the second corner on the basis of the vertex coordinate of the second vertex.

In some embodiments of this application, the second determining unit 330 is specifically configured to:

determine a modulus of a first component of the first vector within a first horizontal plane to be a first target value on the basis of the positional relationship between the first vector and the at least one first spline, where the first component is a component perpendicular to a spline, close to the first vertex, among the at least one first spline; the at least one first spline is a plurality of first splines; the first horizontal plane is a horizontal plane formed by the plurality of first splines; and the at least one target value corresponding to the first corner includes the first target value.

In some aspects, the second determining unit 330 is further specifically configured to:

determine a modulus of a component of the first vector perpendicular to a first horizontal plane to be a second target value on the basis of the positional relationship between the first vector and the at least one first spline, where the at least one first spline is a plurality of first splines; the first horizontal plane is a horizontal plane formed by the plurality of first splines; and the at least one target value corresponding to the first corner includes the second target value.

In some embodiments of this application, the second determining unit 330 is further specifically configured to:

determine a ratio of a modulus of a component of the first vector in a first direction to a first cotangent value to be a third target value on the basis of the positional relationship between the first vector and the at least one first spline, where the first direction is a direction of a spline, close to the first vertex, among the at least one first spline; the at least one first spline is two splines; the first cotangent value is a cotangent value of a half angle of a smallest angle between the two splines; and the at least one target value corresponding to the first corner includes the third target value.

In some aspects, the at least one target value corresponding to the second corner is determined on the basis of a positional relationship between the second vector and at least one second spline; the second vector is a vector from a second control point used for controlling the second corner to the second vertex; and the at least one second spline is a line passing through the second control point and used for representing a contour of the second mesh model.

Based on this, the fourth determining unit 350 may be specifically configured to:

calculate the vertex coordinate of the second vertex on the basis of a position of the at least one second spline, a position of the second control point, and the at least one target value corresponding to the second corner.

In some aspects, the fifth determining unit 360 may specifically configured to:

divide the first mesh model into a plurality of layers on the basis of geometric heights of a plurality of vertexes on the first mesh model;

determine a first horizontal distance between the first vertex and a third vertex in a first map, the first map being a map corresponding to the first mesh model, the plurality of vertexes including the third vertex, and the third vertex and the first vertex being on a same layer among the plurality of layers;

determine a quantity of pixel points per unit length on the first horizontal distance on the basis of the first horizontal distance;

determine the quantity of the pixel points per unit length on the first horizontal distance to be a quantity of pixel points on a second horizontal distance per unit length, the second horizontal distance being a horizontal distance from the second vertex to a fourth vertex in a second map, the fourth vertex being a vertex corresponding to the third vertex after the first corner is deformed into the second corner, and the second map being a map corresponding to the second mesh model;

determine the quantity of the pixel points per unit length on the second horizontal distance to be a U coordinate of the second vertex in the second map; and determine the second mesh model at the second corner on the basis of the U coordinate of the second vertex in the second map and the vertex coordinate of the second vertex.

In some aspects, the fifth determining unit 360 may be further specifically configured to:

determine a first projection of a vector from the first vertex to the third vertex on the spline, close to the first vertex, among the at least one first spline; and determine a ratio of the first horizontal distance to the first projection to be the quantity of the pixel points per unit length on the first horizontal distance.

In some aspects, the fifth determining unit 360 may be further specifically configured to:

determine a second projection of a vector from the second vertex to the fourth vertex on a spline, close to the second vertex, among the at least one second spline, the at least one second spline being a line passing through the second control point used for controlling the second corner, and the spline being used for representing a contour of the second mesh model;

determine a product of the second projection and the quantity of the pixel points per unit length on the second horizontal distance to be the second horizontal distance from the second vertex to the fourth vertex in the second map; and calculate the U coordinate of the second vertex in the second map on the basis of the second horizontal distance and a U coordinate of the fourth vertex in the second map.

In some aspects, the fifth determining unit 360 may be further specifically configured to:

determine a V coordinate of the first vertex in the first map to be a V coordinate of the second vertex in the second map; and perform linear superposition processing on the UV coordinates of the second vertex in the second map and the vertex coordinate of the second vertex, and determine the second mesh model.

In some aspects, the third vertex may be a vertex located in the layer with the first vertex and farthest to the first control point in the direction of the spline, close to the first vertex, among the at least one first spline, and a U coordinate corresponding to the third vertex in the first map is the same as a U coordinate corresponding to the fourth vertex in the second map.

In some aspects, the fifth determining unit 360 may be further specifically configured to:

divide the first mesh model into two third mesh models on the basis of an angular bisector of the first corner; and divide vertexes with adjacent geometric heights in the third mesh models to a same layer to obtain the plurality of layers.

It is understood that the apparatus and the method can correspond to each other, and similar descriptions can refer to each other. To avoid repetitions, details are not described here again. Specifically, the mesh model processing apparatus 300 may correspond to a corresponding main body in the method 100 or the method 200 of the embodiments of this application, and the respective units in the mesh model processing apparatus 300 respectively achieve the corresponding processes in the method 100 or the method 200. For brevity, details are not described here.

It is also understood that the respective units of the mesh model processing apparatus 300 involved in the embodiments of this application may be separately or wholly combined into one or several other units, or one (or more) of the units here may further be divided into multiple functionally smaller units. In this way, the same operations can be implemented, and implementation of the technical effects described herein is not affected. The foregoing units are divided based on logical functions. In an actual application, a function of one unit may be implemented by multiple units, or functions of multiple units may be implemented by one unit. In other aspects, the mesh model processing apparatus 300 may also include other units. In an actual application, these functions may also be cooperatively implemented by other units and may be cooperatively implemented by multiple units. According to some aspects, by running, on processing elements including a central processing unit (CPU), a random access memory (RAM), a read-only memory (ROM), and the like and a general-purpose computing device, such as a general-purpose computer, for element storage, a computer program (including a program code) that can execute all the steps involved in the corresponding method, the mesh model processing apparatus 300 involved in the embodiments of this application may be constructed, and the mesh model processing method of the embodiments of this application may be implemented. The computer program can be recorded on, for example, a computer-readable storage medium, loaded into an electronic device through the computer-readable storage medium, and run in the electronic device, to achieve the corresponding methods described herein.

In other words, the units mentioned above can be implemented in hardware, software instructions, or a combination of software and hardware. Specifically, all the steps of the method embodiment in this application can be completed through an integrated logic circuit of hardware in a processor and/or instructions in the form of software. The steps of the method disclosed in the embodiments of this application can be directly reflected in execution by a hardware decoding processor or by a combination of hardware and software in a decoding processor. Optionally, the software module may be stored in a storage medium that is mature in the art, such as a RAM, a flash memory, a ROM, a programmable ROM, an electrically erasable programmable memory, or a register. The storage medium is located in a memory. The processor reads information in the memory and completes the steps of the above method embodiment in combination with the hardware of the processor.

Figure 16:
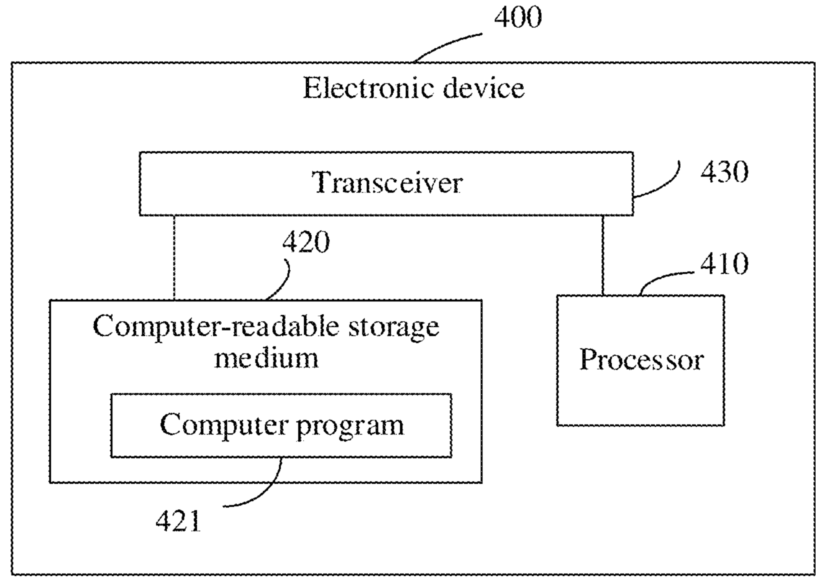
FIG. 16 is a schematic structural diagram of an electronic device according to one or more illustrative aspects described herein.

FIG. 16 is a schematic structural diagram of an illustrative electronic device 400.

As shown in FIG. 16, the electronic device 400 may include a processor 410 and a computer-readable storage medium 420. The processor 410 and the computer-readable storage medium 420 can be connected through a bus or in another way. The computer-readable storage medium 420 is configured to store a computer program 421. The computer program 421 includes computer instructions, and the processor 410 is configured to execute the computer instructions stored in the computer-readable storage medium 420. The processor 410 is a computing and control core of the electronic device 400, and is suitable for implementing one or more computer instructions, specifically for loading and executing one or more computer instructions to achieve corresponding method processes or corresponding functions.

As an example, the processor 410 may also be referred to as a CPU. The processor 410 may include, but not limited to: a general-purpose processor, a digital signal processor (DSP), an application-specific integrated circuit (ASIC), a field-programmable gate array (FPGA) or another programmable logic device, a discrete gate or transistor logic device, a discrete hardware component, and the like.

As an example, the computer-readable storage medium 420 may be a high-speed RAM, or a non-volatile memory, for example, at least one magnetic disk memory. Optionally, the computer-readable storage medium may also be at least one computer-readable storage medium far from the foregoing processor 410. Specifically, the computer-readable storage medium 420 includes but is not limited to: a volatile memory and/or a non-volatile memory. The non-volatile memory may be a ROM, a programmable ROM (PROM), an erasable PROM (EPROM), an electrically EPROM (EEPROM), or a flash memory. The volatile memory may be a RAM serving as an external cache. Through illustrative but not limited description, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM), are available.

In some aspects, the electronic device 400 may be the mesh model processing apparatus 300 shown in FIG. 15. The computer-readable storage medium 420 stores computer instructions. The processor 410 loads and executes the computer instructions stored in the computer-readable storage medium 420 to implement the corresponding steps in the method embodiment. In specific implementation, the computer instructions in the computer-readable storage medium 420 are loaded and executed by the processor 410 to execute the corresponding steps. To avoid repetitions, details are not described here.

According to another aspect, the embodiments of this application further provide a computer-readable storage medium (Memory). The computer-readable storage medium may be a memory device in the electronic device 400 and configured to store programs and data, for example, the computer-readable storage medium 420. It is understood that the computer-readable storage medium 420 here may include an internal storage medium in the electronic device 400, and may of course include an expanded storage medium supported by the electronic device 400. The computer-readable storage medium provides a storage space, and the storage space stores an operating system of the electronic device 400. Moreover, one or more computer instructions suitable for being loaded and executed by the processor 410 are also stored in this storage space, and these computer instructions can be one or more computer programs 421 (including program codes).

The electronic device 400 may further include: a transceiver 430. The transceiver 430 may be connected to the processor 410 or the computer-readable storage medium 420.

The computer-readable storage medium 420 can control the transceiver 430 to communicate with other devices, specifically, to send information or data to or receive information or data from other devices. The transceiver 430 may include a transmitter and a receiver. The transceiver 430 may further include antennas, and a quantity of the antennas may be one or more.

According to another aspect, a computer program product or a computer program is provided. The computer program product or the computer program includes computer instructions stored in a computer-readable storage medium, for example, the computer program 421. In this case, the electronic device 400 may be a computer. The processor 410 reads the computer instructions from the computer-readable storage medium 420, and the processor 410 executes the computer instructions to cause the computer to perform the mesh model processing method provided in the various optional modes described above.

In other words, when software is used for implementation, implementation may be entirely or partially performed in the form of a computer program product. The computer program product includes one or more computer instructions. When the program instructions of the computer are loaded and executed on the computer, all or some of the aspects described herein are run or all or some of the functions are achieved. The computer may be a general-purpose computer, a special-purpose computer, a computer network, or other programmable apparatuses. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired manner (for example, a coaxial cable, an optical fiber, or a digital subscriber line (DSL)) or a wireless manner (for example, infrared, radio, or microwave).

A person of ordinary skill in the art may notice that the respective illustrative units and process steps described herein can be implemented in electronic hardware, or a combination of computer software and electronic hardware. Whether these functions are implemented as hardware or software depends on particular application and design constraint conditions of the technical solutions. A person skilled in the art may use different methods to implement the described functions for each particular application, but it should not be considered that the implementation goes beyond the scope of this application.

The foregoing aspects are merely illustrative implementations, and are not intended to limit the protection scope of protection defined by the following claims. Any variation or replacement readily figured out by a person skilled in the art within the technical scope disclosed herein shall fall within the protection scope of this application to the maximum extent permitted by law.

What is claimed is:

1. A mesh model processing method, comprising:

obtaining a first mesh model, the first mesh model comprising a first corner and a first vertex;

determining a second corner in response to an operation, on a display interface, performed by a user on a first control point used for controlling the first corner;

transforming the first corner into the second corner in response to the operation;

determining, on the basis of a positional relationship between a first vector and a plurality of first splines, at least one target value corresponding to the first corner, the first vector being a vector from the first control point to the first vertex, and the plurality of first splines comprising a line passing through the first control point and used for representing a contour of the first mesh model, wherein the determining the at least one target value corresponding to the first corner comprises:

determining a modulus of a first component of the first vector within a first horizontal plane to be a first target value on the basis of the positional relationship between the first vector and the plurality of first splines, wherein the first component is a component perpendicular to a spline, close to the first vertex, among the plurality of first splines;

determining each of the at least one target values corresponding to the first corner based on a respective target value corresponding to the second corner;

determining a vertex coordinate of a second vertex on the basis of the at least one target value corresponding to the second corner, the second vertex being a vertex corresponding to the first vertex after the first corner is deformed into the second corner;

determining a second mesh model at the second corner on the basis of the vertex coordinate of the second vertex; and rendering an image, for output to the display interface, using the second mesh model.

2. The method according to claim 1, wherein the determining, on the basis of a positional relationship between the first vector and the plurality of first splines, at least one target value corresponding to the first corner comprises:

wherein the first horizontal plane is a horizontal plane formed by the plurality of first splines; and wherein the at least one target value corresponding to the first corner comprises the first target value.

3. The method according to claim 1, wherein the determining, on the basis of a positional relationship between the first vector and the plurality of first splines, at least one target value corresponding to the first corner comprises:

determining a modulus of a component of the first vector perpendicular to a first horizontal plane to be a second target value on the basis of the positional relationship between the first vector and the plurality of first splines, wherein the first horizontal plane is a horizontal plane formed by the plurality of first splines; and wherein the at least one target value corresponding to the first corner comprises the second target value.

4. The method according to claim 1, wherein the determining, on the basis of a positional relationship between the first vector and the plurality of first splines, at least one target value corresponding to the first corner comprises:

determining a ratio of a modulus of a component of the first vector in a first direction to a first cotangent value to be a third target value on the basis of the positional relationship between the first vector and the plurality of first splines, wherein the first direction is a direction of the spline, close to the first vertex, among the plurality of first splines;

wherein the plurality of first splines is two splines;

wherein the first cotangent value is a cotangent value of a half angle of a smallest angle between the two splines; and wherein the at least one target value corresponding to the first corner comprises the third target value.

5. The method according to claim 1, wherein the at least one target value corresponding to the second corner is determined on the basis of a positional relationship between a second vector and a plurality of second splines;

wherein the second vector is a vector from a second control point used for controlling the second corner to the second vertex;

wherein the plurality of second splines is comprises a line passing through the second control point and used for representing a contour of the second mesh model; and the determining the vertex coordinate of a second vertex on the basis of the at least one target value corresponding to the second corner comprises:

calculating the vertex coordinate of the second vertex on the basis of a position of the plurality of second splines, a position of the second control point, and the at least one target value corresponding to the second corner.

6. The method according to claim 1, wherein the determining the second mesh model at the second corner on the basis of the vertex coordinate of the second vertex comprises:

dividing the first mesh model into a plurality of layers on the basis of geometric heights of a plurality of vertexes on the first mesh model;

determining a first horizontal distance between the first vertex and a third vertex in a first map, the first map being a map corresponding to the first mesh model, the plurality of vertexes comprising the third vertex, and the third vertex and the first vertex being on a same layer among the plurality of layers;

determining a quantity of pixel points per unit length on the first horizontal distance on the basis of the first horizontal distance;

determining the quantity of the pixel points per unit length on the first horizontal distance to be a quantity of pixel points on a second horizontal distance per unit length, the second horizontal distance being a horizontal distance from the second vertex to a fourth vertex in a second map, the fourth vertex being a vertex corresponding to the third vertex after the first corner is deformed into the second corner, and the second map being a map corresponding to the second mesh model;

determining the quantity of the pixel points per unit length on the second horizontal distance to be a U coordinate of the second vertex in the second map; and determining the second mesh model at the second corner on the basis of the U coordinate of the second vertex in the second map and the vertex coordinate of the second vertex.

7. The method according to claim 6, wherein the determining the quantity of pixel points per unit length on the first horizontal distance on the basis of the first horizontal distance comprises:

determining a first projection of a vector from the first vertex to the third vertex on the spline, close to the first vertex, among the plurality of first splines; and determining a ratio of the first horizontal distance to the first projection to be the quantity of the pixel points per unit length on the first horizontal distance.

8. The method according to claim 6, wherein the determining the quantity of the pixel points per unit length on the second horizontal distance to be the U coordinate of the second vertex in the second map comprises:

determining a second projection of a vector from the second vertex to the fourth vertex on a spline, close to the second vertex, among the plurality of second splines, the plurality of second splines comprising a line passing through the second control point used for controlling the second corner, and the spline being used for representing a contour of the second mesh model;

determining a product of the second projection and the quantity of the pixel points per unit length on the second horizontal distance to be the second horizontal distance from the second vertex to the fourth vertex in the second map; and calculating the U coordinate of the second vertex in the second map on the basis of the second horizontal distance and a U coordinate of the fourth vertex in the second map.

9. The method according to claim 6, wherein the determining the second mesh model at the second corner on the basis of the U coordinate of the second vertex in the second map and the vertex coordinate of the second vertex comprises:

determining a V coordinate of the first vertex in the first map to be a V coordinate of the second vertex in the second map; and performing linear superposition processing on the UV coordinates of the second vertex in the second map and the vertex coordinate of the second vertex, and determining the second mesh model.

10. The method according to claim 6, wherein the third vertex is a vertex located in the layer with the first vertex and farthest to the first control point in the direction of the spline, close to the first vertex, among the plurality of first splines, and a U coordinate corresponding to the third vertex in the first map is the same as a U coordinate corresponding to the fourth vertex in the second map.

11. The method according to claim 6, wherein the dividing the first mesh model into a plurality of layers on the basis of geometric heights of a plurality of vertexes on the first mesh model comprises:

dividing the first mesh model into two third mesh models on the basis of an angular bisector of the first corner; and dividing vertexes with adjacent geometric heights in the third mesh models to a same layer to obtain the plurality of layers.

12. One or more non-transitory computer readable storage media comprising computer readable instructions which, when executed by a data processing device, configure the data processing device to perform mesh model processing by:

obtaining a first mesh model, the first mesh model comprising a first corner and a first vertex;

determining a second corner in response to an operation, on a display interface, performed by a user on a first control point used for controlling the first corner;

transforming the first corner into the second corner in response to the operation;

determining, on the basis of a positional relationship between a first vector and plurality of first splines, at least one target value corresponding to the first corner, the first vector being a vector from the first control point to the first vertex, and the plurality of first splines comprising a line passing through the first control point and used for representing a contour of the first mesh model, wherein the determining the at least one target value corresponding to the first corner comprises:

determining a modulus of a first component of the first vector within a first horizontal plane to be a first target value on the basis of the positional relationship between the first vector and the plurality of first splines, wherein the first component is a component perpendicular to a spline, close to the first vertex, among the plurality of first splines;

determining each of the at least one target values corresponding to the first corner based on a respective target value corresponding to the second corner;

determining a vertex coordinate of a second vertex on the basis of the at least one target value corresponding to the second corner, the second vertex being a vertex corresponding to the first vertex after the first corner is deformed into the second corner;

determining a second mesh model at the second corner on the basis of the vertex coordinate of the second vertex; and rendering an image, for output to the display interface, using the second mesh model.

13. The computer readable storage media according to claim 12, wherein the determining, on the basis of a positional relationship between the first vector and the plurality of first splines, at least one target value corresponding to the first corner comprises:

wherein the first horizontal plane is a horizontal plane formed by the plurality of first splines; and wherein the at least one target value corresponding to the first corner comprises the first target value.

14. The computer readable storage media according to claim 12, wherein the determining, on the basis of a positional relationship between the first vector and the plurality of first splines, at least one target value corresponding to the first corner comprises:

determining a modulus of a component of the first vector perpendicular to a first horizontal plane to be a second target value on the basis of the positional relationship between the first vector and the plurality of first splines, wherein the first horizontal plane is a horizontal plane formed by the plurality of first splines; and wherein the at least one target value corresponding to the first corner comprises the second target value.

15. The computer readable storage media according to claim 12, wherein the determining, on the basis of a positional relationship between the first vector and the plurality of first splines, at least one target value corresponding to the first corner comprises:

determining a ratio of a modulus of a component of the first vector in a first direction to a first cotangent value to be a third target value on the basis of the positional relationship between the first vector and the plurality of first splines, wherein the first direction is a direction of the spline, close to the first vertex, among the plurality of first splines;

wherein the plurality of first splines is two splines;

wherein the first cotangent value is a cotangent value of a half angle of a smallest angle between the two splines; and wherein the at least one target value corresponding to the first corner comprises the third target value.

16. The computer readable storage media according to claim 12, wherein the at least one target value corresponding to the second corner is determined on the basis of a positional relationship between a second vector and a plurality of second splines;

wherein the second vector is a vector from a second control point used for controlling the second corner to the second vertex;

wherein the plurality of second splines comprises a line passing through the second control point and used for representing a contour of the second mesh model; and the determining the vertex coordinate of a second vertex on the basis of the at least one target value corresponding to the second corner comprises:

calculating the vertex coordinate of the second vertex on the basis of a position of the plurality of second splines, a position of the second control point, and the at least one target value corresponding to the second corner.

17. The computer readable storage media according to claim 12, wherein the determining the second mesh model at the second corner on the basis of the vertex coordinate of the second vertex comprises:

dividing the first mesh model into a plurality of layers on the basis of geometric heights of a plurality of vertexes on the first mesh model;

determining a first horizontal distance between the first vertex and a third vertex in a first map, the first map being a map corresponding to the first mesh model, the plurality of vertexes comprising the third vertex, and the third vertex and the first vertex being on a same layer among the plurality of layers;

determining a quantity of pixel points per unit length on the first horizontal distance on the basis of the first horizontal distance;

determining the quantity of the pixel points per unit length on the first horizontal distance to be a quantity of pixel points on a second horizontal distance per unit length, the second horizontal distance being a horizontal distance from the second vertex to a fourth vertex in a second map, the fourth vertex being a vertex corresponding to the third vertex after the first corner is deformed into the second corner, and the second map being a map corresponding to the second mesh model;

determining the quantity of the pixel points per unit length on the second horizontal distance to be a U coordinate of the second vertex in the second map; and determining the second mesh model at the second corner on the basis of the U coordinate of the second vertex in the second map and the vertex coordinate of the second vertex.

18. The computer readable storage media according to claim 17, wherein the determining the quantity of pixel points per unit length on the first horizontal distance on the basis of the first horizontal distance comprises:

determining a first projection of a vector from the first vertex to the third vertex on the spline, close to the first vertex, among the plurality of first splines; and determining a ratio of the first horizontal distance to the first projection to be the quantity of the pixel points per unit length on the first horizontal distance.

19. The computer readable storage media according to claim 17, wherein the determining the quantity of the pixel points per unit length on the second horizontal distance to be the U coordinate of the second vertex in the second map comprises:

determining a second projection of a vector from the second vertex to the fourth vertex on a spline, close to the second vertex, among the plurality of second splines, the plurality of second splines comprising a line passing through the second control point used for controlling the second corner, and the spline being used for representing a contour of the second mesh model;

determining a product of the second projection and the quantity of the pixel points per unit length on the second horizontal distance to be the second horizontal distance from the second vertex to the fourth vertex in the second map; and calculating the U coordinate of the second vertex in the second map on the basis of the second horizontal distance and a U coordinate of the fourth vertex in the second map.

20. A data processing device comprising:

a processor controlling operations of the data processing device; and memory storing computer readable instructions which, when executed by the processor, configure the data processing device to perform mesh model processing by:

obtaining a first mesh model, the first mesh model comprising a first corner and a first vertex;

determining a second corner in response to an operation, on a display interface, performed by a user on a first control point used for controlling the first corner;

transforming the first corner into the second corner in response to the operation;

determining, on the basis of a positional relationship between a first vector and a plurality of first splines, at least one target value corresponding to the first corner, the first vector being a vector from the first control point to the first vertex, and the plurality of first splines comprising a line passing through the first control point and used for representing a contour of the first mesh model, wherein the determining the at least one target value corresponding to the first corner comprises:

determining a modulus of a first component of the first vector within a first horizontal plane to be a first target value on the basis of the positional relationship between the first vector and the plurality of first splines, wherein the first component is a component perpendicular to a spline, close to the first vertex, among the plurality of first splines;

determining each of the at least one target values corresponding to the first corner based on a respective target value corresponding to the second corner;

determining a vertex coordinate of a second vertex on the basis of the at least one target value corresponding to the second corner, the second vertex being a vertex corresponding to the first vertex after the first corner is deformed into the second corner;

determining a second mesh model at the second corner on the basis of the vertex coordinate of the second vertex; and rendering an image, for output to the display interface, using the second mesh model.

* * * * *